(12) United States Patent
Hanika et al.

(10) Patent No.: US 8,570,322 B2
(45) Date of Patent: Oct. 29, 2013

(54) METHOD, SYSTEM, AND COMPUTER PROGRAM PRODUCT FOR EFFICIENT RAY TRACING OF MICROPOLYGON GEOMETRY

(75) Inventors: Johannes Hanika, Ulm (DE); Alexander Keller, Berlin (DE); Hendrik Lensch, Blaustein (DE)

(73) Assignee: NVIDIA Corporation, Santa Clara, CA (US)

( * ) Notice: Subject to any disclaimer, the term of this patent is extended or adjusted under 35 U.S.C. 154(b) by 960 days.

(21) Appl. No.: 12/464,354

(22) Filed: May 12, 2009

(65) Prior Publication Data

US 2010/0289799 A1    Nov. 18, 2010

(51) Int. Cl.
*G06T 15/00* (2011.01)
(52) U.S. Cl.
USPC .......................................... 345/421; 345/426
(58) Field of Classification Search
None
See application file for complete search history.

(56) References Cited

U.S. PATENT DOCUMENTS

| | | | |
|---|---|---|---|
| 7,952,583 B2 | 5/2011 | Waechter et al. | |
| 2005/0231508 A1* | 10/2005 | Christensen et al. | 345/428 |
| 2006/0036802 A1* | 2/2006 | Drukin | 711/103 |
| 2007/0024615 A1* | 2/2007 | Keller et al. | 345/421 |
| 2007/0182732 A1* | 8/2007 | Woop et al. | 345/420 |
| 2008/0021682 A1* | 1/2008 | Holland | 703/5 |
| 2009/0284523 A1* | 11/2009 | Peterson et al. | 345/419 |

OTHER PUBLICATIONS

Reichl, M., Dünger, R., Schiewe, A., Klemmer, T., Hartleb, M., Lux, C., Fröhlich, B., GPU-based Ray Tracing of Dynamic Scenes , Proceedings 5. Workshop „Virtuelle and Erweiterte Realität der GI-Fachgruppe VR/AR, pp. 245-260, 2008.*
Peter Schroder and Steven Drucker. A data parallel algorithm for raytracing of heterogeneous databases. In Proceedings of Computer Graphics Interface, 1992, p. 167-175.*
Christensen P., Fong J., Laur D., Batali D.: Ray tracing for the movie 'Cars'. In Proc. 2006 IEEE Symposium on Interactive Ray Tracing (2006), pp. 73-78.*
Lauterbach C., Yoon S.-E., Tang M., Manocha D.: ReduceM: Interactive and memory efficient ray tracing of large models. Computer Graphics Forum 27, 4 (2008), 1313-1321.).*
H. Dammertz, A. Keller, "Improving Ray Tracing Precision by Object Space Intersection Computation," rt, pp. 25-31, 2006 IEEE Symposium on Interactive Ray Tracing, 2006.*
Solomon Boulos, Ingo Wald and Carsten Benthin, Adaptive Ray Packet Reordering, Proceedings of IEEE Symposium on Interactive Ray Tracing 2008.*
Budge, B. et al., "Out-of-core Data Management for Path Tracing on Hybrid Resources," Computer Graphics Forum, Proceedings of Eurographics, 2009, vol. 28, No. 2.

(Continued)

*Primary Examiner* — Daniel Hajnik
*Assistant Examiner* — Sultana M Zalalee
(74) *Attorney, Agent, or Firm* — Zilka-Kotab, PC

(57) ABSTRACT

A system, method, and computer program product are provided for efficiently ray tracing micropolygon or other highly complex geometry. In operation, a first hierarchy of a plurality of objects is established. Additionally, rays are traced using the first hierarchy to efficiently identify which of the plurality of objects are potentially intersected. Furthermore, at least one of the potentially intersected objects are decomposed, on-demand, into a set of subobjects, each set of subobjects corresponding to one of the at least one of the potentially intersected objects. Still yet, a second hierarchy is established for at least one of the set of subobjects, the second hierarchy being determined by a connectivity of subobjects in an associated set of subobjects in order to accelerate ray tracing.

31 Claims, 5 Drawing Sheets

(56) References Cited

OTHER PUBLICATIONS

Carr, N. A. et al., "Fast GPU Ray Tracing of Dynamic Meshes using Geometry Images," Proceedings of the 2006 conference on Graphics interface, 2006, pp. 203-209.

Christensen, P. H. et al., "Ray Tracing for the Movie 'Cars'," IEEE Symposium on Interactive Ray Tracing, 2006, pp. 1-6.

Cline, D. et al., "Lightweight Bounding Volumes for Ray Tracing," Journal of Graphics Tools, 2006, vol. 11, No. 4, pp. 61-71.

Cook, R. et al., "The Reyes Image Rendering Architecture," Computer Graphics, Jul. 1987, vol. 21, No. 4, pp. 95-102.

Wald, I. et al., "On building fast kd-trees for Ray Tracing, and on doing that in O(N log N)," IEEE Symposium on Interactive Ray Tracing, 2006, pp. 61-69.

Dammertz, H. et al. "Shallow Bounding Volume Hierarchies for Fast SIMD Ray Tracing of Incoherent Rays," Computer Graphics Forum, Proceedings of the 19th Eurographics Symposium on Rendering, 2008, pp. 1225-1234.

Ernst, M. et al. "Multi Bounding Volume Hierarchies," In Proceedings of the 2008 IEEE/EG Symposium on Interactive Ray Tracing, 2008, pp. 35-40.

Goldsmith, J. et al., "Automatic Creation of Object Hierarchies for Ray Tracing," IEEE Computer Graphics & Applications, 1987, pp. 14-20.

Hanika, J. et al., "Towards Hardware Ray Tracing using Fixed Point Arithmetic," Proceedings of the 2007 IEEE/EG Symposium on Interactive Ray Tracing, 2007, pp. 119-128.

Igehy, H., "Tracing Ray Differentials," ACM Transactions on Graphics, Proceedings of SIGGRAPH 1999, 1999, pp. 179-186.

Kato, T. et al., "'Kilauea'—Parallel Global Illumination Renderer," Fourth Eurographics Workshop on Parallel Graphics and Visualization, 2002, pp. 7-13.

Lacewell, D. et al., "Raytracing Prefiltered Occlusion for Aggregate Geometry," IEEE Symposium on Interactive Raytracing, 2008, pp. 19-26.

Lamparter, B. et al., "The Ray-z-Buffer—An Approach for Ray Tracing Arbitrarily Large Scenes," Aug. 1, 1991, pp. 1-33.

Lokovic, T. et al., "Deep Shadow Maps," In SIGGRAPH 2000: Proceedings of the 27th annual Conference on Computer Graphics and Interactive Techniques, 2000, pp. 385-392.

MacDonald, J. et al., "Heuristics for ray tracing using space subdivision," The Visual Computer, 1990, vol. 6, pp. 153-166.

Navratil, P. A. et al., "Dynamic Ray Scheduling to Improve Ray Coherence and Bandwidth Utilization," Technical Report TR-07-19, Apr. 12, 2007, pp. 1-10.

Pharr, M. et al., "Geometry Caching for Ray-Tracing Displacement Maps," 1996, pp. 1-10.

Pharr, M. et al., "Rendering Complex Scenes with Memory-Coherent Ray Tracing," SIGGRAPH 1997, Proceedings of the 24th annual conference on Computer graphics and interactive techniques, 1997, pp. 101-108.

Djeu, P. et al., "Razor: An Architecture for Dynamic Multiresolution Ray Tracing," Technical Report TR-07-52, Jan. 24, 2007, pp. 1-13.

Tatarchuk, N., "Practical Dynamic Parallax Occlusion Mapping," ACM SIGGRAPH 2005 Sketches, 2005.

Wald, I. et al., "Getting Rid of Packets—Efficient SIMD Single-Ray Traversal Using Multi-branching BVHs -," Proceedings of the 2008 IEEE/EG Symposium on Interactive Ray Tracing, 2008, pp. 49-57.

Wald, I. "On fast Construction of SAH based Bounding Volume Hierarchies," Proceedings of the 2007 Eurographics/IEEE Symposium on Interactive Ray Tracing, 2007, pp. 33-40.

\* cited by examiner

METHOD, SYSTEM, AND COMPUTER PROGRAM PRODUCT FOR EFFICIENT RAY TRACING OF MICROPOLYGON GEOMETRY

FIELD OF THE INVENTION

The present invention relates to ray tracing, and more particularly to image synthesis by efficiently ray tracing highly detailed geometry.

BACKGROUND

Previously, building an acceleration data structure for efficient ray tracing of highly complex geometry was prohibitively expensive or imposed restrictions on how the geometry had to be modeled. There is thus a need for addressing these and/or other issues associated with the prior art.

SUMMARY

A system, method, and computer program product are provided for efficiently ray tracing micropolygon or other highly complex geometry. In operation, a first hierarchy of a plurality of objects is established. Additionally, rays are traced using the first hierarchy to efficiently identify which of the plurality of objects are potentially intersected. Furthermore,.at least one of the potentially intersected objects are decomposed, on-demand, into a set of subobjects, each set of subobjects corresponding to one of the at least one of the potentially intersected objects. Still yet, a second hierarchy is established for at least one of the set of subobjects, the second hierarchy being determined by a connectivity of subobjects in an associated set of subobjects in order to accelerate ray tracing.

DETAILED DESCRIPTION

Figure 1:
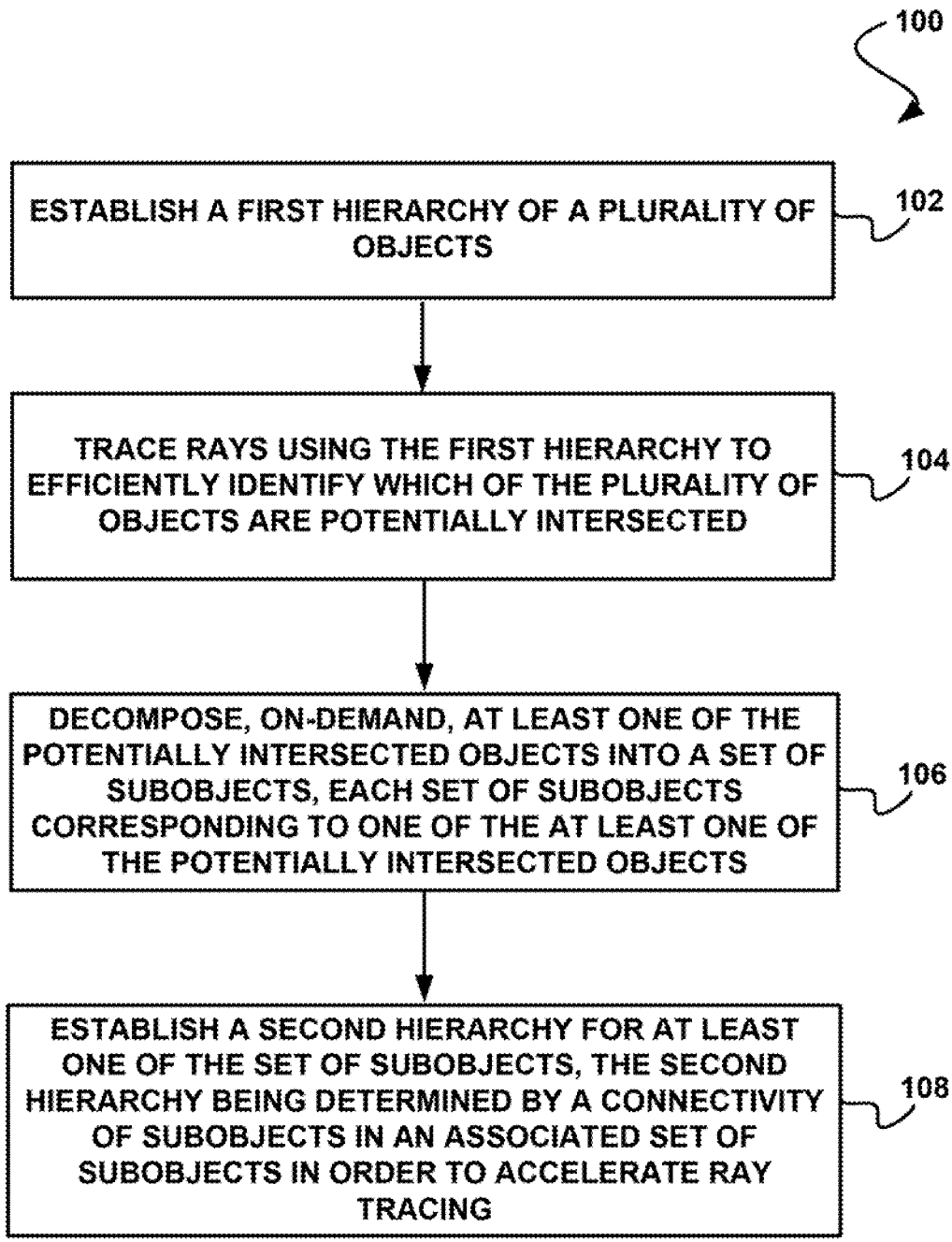
FIG. 1 shows a method for efficiently ray tracing micropolygon or other highly complex geometry, in accordance with one embodiment.

FIG. 1 shows a method for efficiently ray tracing micropolygon or other highly complex geometry, in accordance with one embodiment. As shown, a first hierarchy of a plurality of objects is established. See operation 102.

Additionally, rays are traced using the first hierarchy to efficiently identify which of the plurality of objects are potentially intersected. See operation 104.

Furthermore, at least one of the potentially intersected objects is decomposed, on-demand, into a set of subobjects, each set of subobjects corresponding to one of the at least one of the potentially intersected objects. See operation 106. In this case, decomposing the potentially intersected objects into the set of subobjects may include generating the set of subobjects. In one embodiment, an individual level of detail of any decomposition resulting from the decomposing may be selected adaptively based on a selected criterion.

Still yet, a second hierarchy is established for at least one of the set of subobjects, the second hierarchy being determined by a connectivity of subobjects in an associated set of subobjects in order to accelerate ray tracing. See operation 108. In one embodiment, the intersection of the ray and the bounding box of a subobject may be used instead of the intersection of a ray and the actual subobject as an approximate intersection of a ray and a subobject.

In this case, self intersection may be ameliorated by offsetting rays depending on at least one of: the potentially intersected objects; the set of subobjects; or a bounding volume of one or more of the subobjects. Furthermore, in one embodiment, self intersection may be ameliorated by offsetting rays proportional to a length of at least one of a diagonal or a longest side of an object bounding box divided by 2 to a power of the level of detail, where zero corresponds to a coarsest level of detail.

It should be noted that, in one embodiment, the ray tracing may be performed in parallel. Furthermore, in one embodiment, the objects may include surface patches that are tessellated into a two-dimensional array of micropolygons from which a complete hierarchy is capable of being built in time linear in the number of micropolygons. In this case, the tessellation may yield one of a triangular or quadrilateral mesh. Additionally, the surface patches may include one of a multiresolution surface, subdivision surface, or a parametric surface, which may be capable of being trimmed and displaced.

In one embodiment, motion maybe considered as temporal displacement. As long as bounding volumes with respect to segments of motion can be determined, the embodiment may be applied efficiently even for non-linear motion. In this case, the first hierarchy and the sets of subobjects may be generated adaptively with respect to their motion and potentially for a given time. Additionally, motion may be specified by splines over specified instants in time. Further, interpolation may be used to compute all data at the given time to perform ray intersection. It should be noted that, in some cases, motion blur may be simulated.

As part of the ray tracing, in one embodiment, ray data may be computed from a ray identification number. Furthermore, a traversal of the first hierarchy may include considering multiple rays simultaneously such that each of the plurality of objects is considered at most once during ray tracing.

In another embodiment, in a traversal of the first hierarchy, for each of a plurality of rays a predefined number of closest objects that are potentially intersected may be recorded and records of pairs of ray and object identification resulting from the recording may be sorted by object identification. In this case, for each of the object identifications, if an object is intersected by at least one of the rays associated with the object identification, an identified object may be decomposed into a plurality of subobjects and a second hierarchy may be determined by a connectivity of the plurality of subobjects in order to accelerate ray tracing. As an option, at least one of a predefined number of recorded pairs may be increased when rays are terminated or terminated rays may be directly replaced by new rays. In this case, the new rays may be computed in dependence of the terminated rays and may be directly intersected with a currently decomposed set of subobjects.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
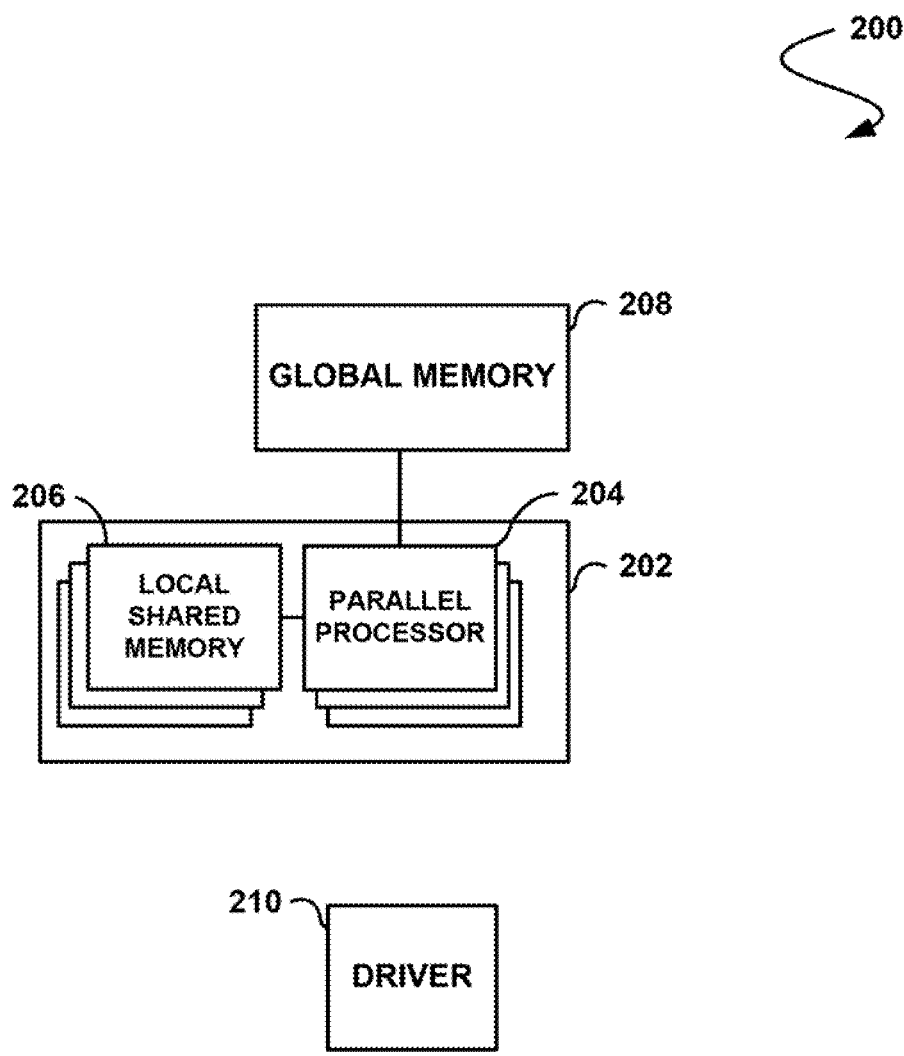
FIG. 2 shows a system for efficiently ray tracing micropolygon or other highly complex geometry, in accordance with another embodiment.

FIG. 2 shows a system 200 for efficiently ray tracing micropolygon or other highly complex geometry, in accordance with one embodiment. As an option, the present system 200 may be implemented in the context of the functionality and architecture of FIG. 1. Of course, however, the present system 200 may be implemented in any desired environment. It should also be noted that the aforementioned definitions may apply during the present description.

As shown, a parallel processing architecture 202 is provided. Such parallel processing architecture 202 includes a plurality of parallel processors 204. While not shown, such parallel processors 204 may be capable of operating on a predetermined number of threads. To this end, each of the parallel processors 204 may operate in parallel, while the corresponding threads may also operate in parallel.

In one embodiment, the parallel processing architecture 202 may include a single instruction multiple data (SIMD) architecture. In such a system, the threads being executed by the processor are collected into groups such that, at any instant in time, all threads within a single group are executing precisely the same instruction but on potentially different data.

In another embodiment, the foregoing parallel processing architecture 202 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 202 may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture 202 may include local shared memory 206. Each of the parallel processors 204 of the parallel processing architecture 202 may read and/or write to its own local shared memory 206. This shared memory 206 may consist of physically separate memories associated with each processor or it may consist of separately allocated regions of one or more memories shared amongst the processors 204. Further, in the illustrated embodiment, the shared memory 206 may be embodied on an integrated circuit on which the processors 204 of the parallel processing architecture 202 are embodied.

Still yet, global memory 208 is shown to be included. In use, such global memory 208 is accessible to all the processors 204 of the parallel processing architecture 202. As shown, such global memory 208 may be embodied on an integrated circuit that is separate from the integrated circuit on which the processors 204 of the aforementioned parallel processing architecture 202 are embodied. While the parallel processing architecture 202 is shown to be embodied on the various integrated circuits of FIG. 2 in a specific manner, it should be noted that the system components may or may not be embodied on the same integrated circuit, as desired.

Still yet, the present system 200 of FIG. 2 may further include a driver 210 for controlling the parallel processing architecture 202, as desired. In one embodiment, the driver 210 may include a library, for facilitating such control. For example, such library 210 may include a library call that may instantiate the functionality set forth herein. Further, in another embodiment, the driver 210 may be capable of providing general computational capabilities utilizing the parallel processing architecture 202 (e.g. a graphics processor, etc.). An example of such a driver may be provided in conjunction with the CUDA™ framework provided by NVIDIA Corporation. In use, the driver 210 may be used to control the parallel processing architecture 202 for efficiently ray tracing micropolygon or other highly complex geometry.

Figure 3:
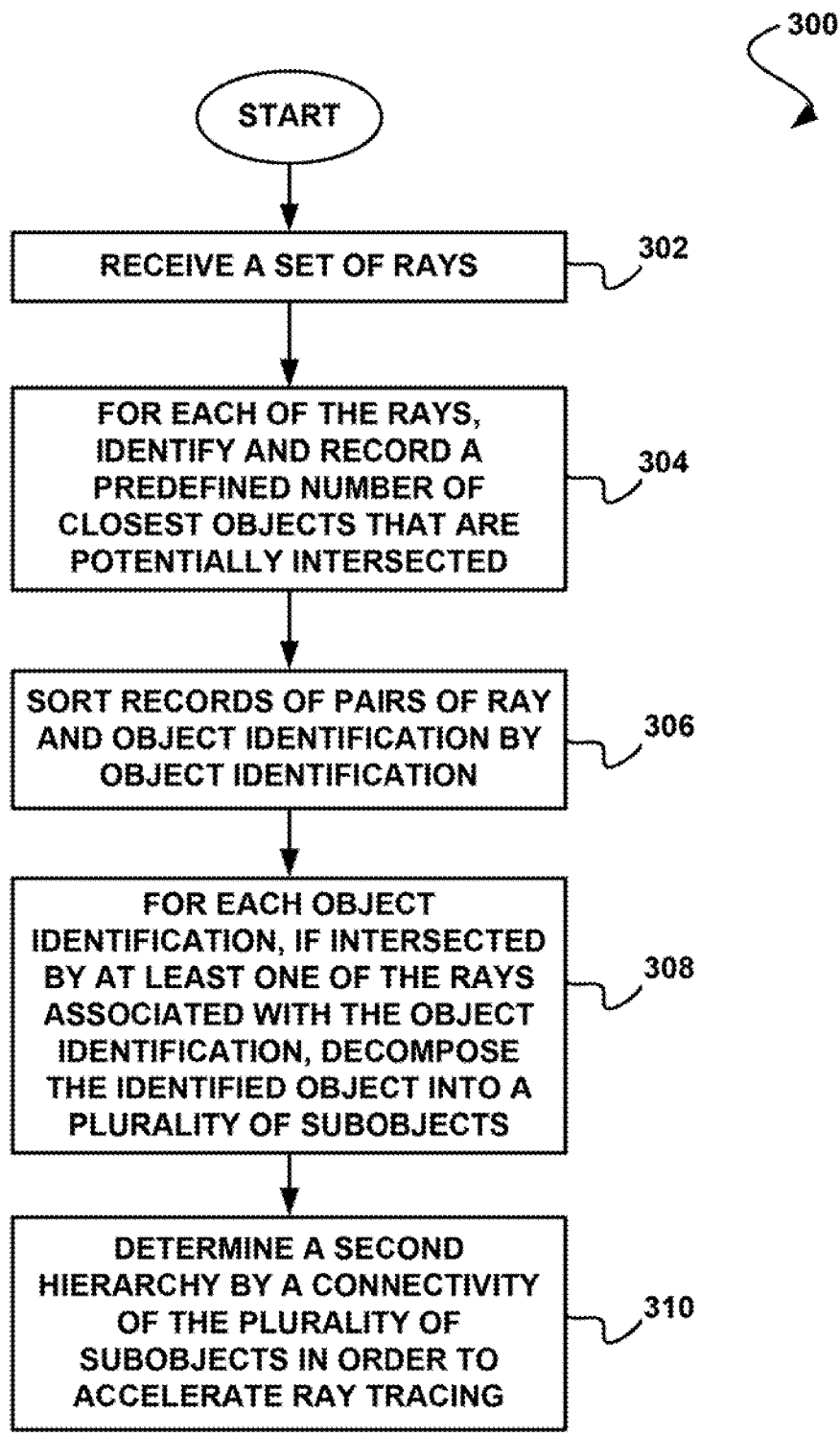
FIG. 3 shows a method for efficiently ray tracing micropolygon or other highly complex geometry, in accordance with another embodiment.

FIG. 3 shows a method 300 for efficiently ray tracing micropolygon or other highly complex geometry, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, a set of rays is received. See operation 302. In this case, the set of rays may be generated and/or be received as part of a ray tracing process. Furthermore, the rays may be a set of rays present at a node in a hierarchy.

For each of the rays in the set of rays, a predefined number of closest objects that are potentially intersected are recorded. See operation 304. These records of pairs of ray and object identification then are sorted by object identification. See operation 306.

For each object identification, if the object is intersected by at least one of the rays associated with the object identification, the identified object is decomposed into a plurality of subobjects. See operation 308. Furthermore, a second hierarchy is determined by a connectivity of the plurality of subobjects in order to accelerate ray tracing. See operation 310.

It should be noted that after the recording of the aforementioned pairs, the process may be continued for each ray at the node of the first hierarchy where the recording was interrupted. Furthermore, in one embodiment, at least one of the predefined number of recorded pairs may be increased when rays are terminated. In another embodiment, terminated rays may be directly replaced by new rays.

In this way, a ray tracing architecture may be implemented that allows the ray tracing of highly complex geometry resulting from the classic modeling approach of surface patches that are tessellated into micropolygons. The observation that the acceleration data structure implied by the topology of the micropolygons is of high quality and can be constructed in time linear in the number of micropolygons leads to efficiency in this ray tracing. While preserving all advantages of previous production rendering systems, by implementing the aforementioned techniques, ray tracing is available in a unified manner, simplifying workflow, and even allowing for full light transport simulation.

Geometric detail is often modeled by parametric or multi-resolution surface patches that are displaced and have to be rendered including motion blur. Games follow a similar two-level approach of modeling. In the case of games, while the rasterized geometry may be rather coarse, detail may be added by shaders that compute local approximations to ray tracing.

As ray tracing allows for precise shadows, reflections, and light transport simulation, it may be desirable to completely ray trace such geometric content without approximations. Adapting to a two-level modeling approach and recognizing that efficient auxiliary data structures for accelerated ray tracing may be built in time linear in the number of elements resulting from tessellating a surface patch, it becomes possible to ray trace complex geometry more efficiently than previous approaches.

In one embodiment, a technical director in a ray tracing system may program both the shading and surface patch tessellation. As long as the surface patches can be organized in main memory, the artist may model and efficiently ray trace geometric detail that is capable of going far beyond what can be stored in main memory.

In the past, the Reyes image rendering architecture has been used very successfully in movie production. The fundamental assumptions and design principles have allowed users to model and render diverse and complex content.

Using the aforementioned techniques, it is possible to make ray tracing paramount in accordance with the assumptions of the Reyes architecture. The design principles of natural coordinates, vectorization, common representation, locality, and texture maps remain the same, leading to a unified ray tracing architecture instead of a back door extension.

It should be noted that the two-level modeling approach mentioned above makes ray tracing quite different from ray tracing general massive geometry, because much more data locality is intrinsic as opposed to the general setting. Additionally, a scalable parallelization may be implemented, thus allowing for realtime ray tracing.

According to the two-level modeling approach, ray tracing may be accelerated using a two-level hierarchy. The top-level hierarchy organizes the list of surfaces patches. In this case, one reason for the efficiency is the observation that the regular topology (or connectivity) of a micropolygon buffer implies a high quality acceleration data structure that may be constructed in time linear in the number of its micropolygons. In one embodiment, this technique may be easily extended to temporal ray tracing as required for motion blur simulation.

As an option, such a micropolygon buffer may be filled on demand with the micropolygons resulting from the tessellation of a surface patch. However, in some cases, this technique may be costly and ideally would be performed only once.

As stated above, the top-level hierarchy may organize the surface patches. Conservative axis-aligned bounding boxes of the patches may be computed by instancing the actual micropolygons of the leaf objects. Depending on how the surface detail is modeled, interval arithmetic or estimates of bounds may be more efficient in some cases.

For very complex instancing or tessellation processes, such as very large models or computationally expensive procedural content, it is sometimes desirable to visit every leaf node only one single time. As an option, this may be accomplished by tracing all available rays through the acceleration structure at the same time. Consequently, it may be sufficient to allocate memory for only one buffer that is filled on demand.

For this purpose, a very simple acceleration structure may be utilized. For example, the list of surface patches may be partitioned using a binary bounding volume hierarchy, constructed using the surface area heuristic. In this case, all inner nodes may store an axis aligned bounding box and have exactly two children, while each leaf node references exactly one surface patch. Consequently, neither empty leaves nor special cases need to be considered. The number of nodes is at most linear in the number of surface patches.

Ray tracing may then begin by intersecting the whole buffer of rays with the left child box of the root node. The list of rays may then be sorted such that all rays intersecting this box are located in one block at the beginning of the buffer. The process may then repeat recursively with the left child of the currently tested node. When stepping up in the recursion, the right child box may be intersected, the ray buffer may be sorted accordingly, and the algorithm may descend in the right branch of the bounding volume hierarchy (BVH) tree. As a result, all rays that intersect a specific leaf node are one contiguous block in the ray buffer and each leaf may be visited at most once.

In some cases, this approach does not allow for traversing all rays along their ray direction. Therefore, "left" and "right" may be swapped according to a heuristic based on the ray directions in order to traverse the majority of rays along their direction.

Tracing single rays allows for sorted traversal, in which closer nodes are processed first. This enables the early termination of rays that have already intersected an object closer than the entry point of the next bounding box. In addition, higher branching factors for the BVH may lead to a higher efficiency. In some cases, such optimizations may be difficult to realize when simultaneously tracing multiple rays.

In one embodiment, in order to reduce multiple accesses to the same leaf node and benefit from the above optimizations, the rays may be traced up to some entry node in the hierarchy and then spatial sorting may be performed.

Additionally, in one embodiment, a Quad-BVH (QBVH) may be constructed, where the leaves are the conservative bounding boxes of a single patch. Given an array of R rays, each ray may traverse the hierarchy in turn, which may then optionally be executed in parallel by partitioning the array.

As an option, instead of directly intersecting a ray with patches, the N first intersections of a ray with a leaf bounding box may be recorded in an array that keeps tuples of the form (rayid, leafid). If this array is sized to keep up to M tuples, N=M/R. This array may then be sorted by leafid. Using the resulting permutation, the array of rays may remain in original order, which can be used to implicitly associate pixel positions and rays, etc.

For each leafid in the array, the leaf object may be tessellated and the rays corresponding to the leafid may be traced through the leaf object. In a parallel implementation, each thread may pick the next leafid as a task. In one embodiment, writing back intersection results to rays may be synchronized and/or serialized by implementing a few locks for larger blocks of rays or by writing the ray intersections to small buffers for each thread, which may be synchronized at the end.

Once all tuples (rayid, leafid) are processed, the rays may continue the top-level traversal. Since single ray traversal may be ordered by ray direction, it may be easy to determine which children have already been processed, when stepping up in the hierarchy. It may therefore be sufficient to keep a reference to the last node that a ray traversed in order to continue traversal later on.

As an option, early termination may be realized by intersecting the ray and a leaf bounding box prior to tessellation. The resulting number R' of remaining rays may then be used to determine the next N'=M/R'. In this way, the process does not have to be repeated too often, as the depth complexity of most scenes is reached quickly.

Additionally, this scheme may enable additional optimizations. First, in the presence of shaders, which require to access large memory blocks (e.g. such as measured BRDF data, etc.), many rays may have an early out event at the same time and thus the memory may not have to be accessed several times. Second, to further reduce the need for repeated tessellation over generations of rays, the early termination event may be used to shade a terminated block of rays and spawn new ray directions, which may directly be intersected with the already tessellated originating patch and then be re-injected into the top-level traversal.

Figure 4:
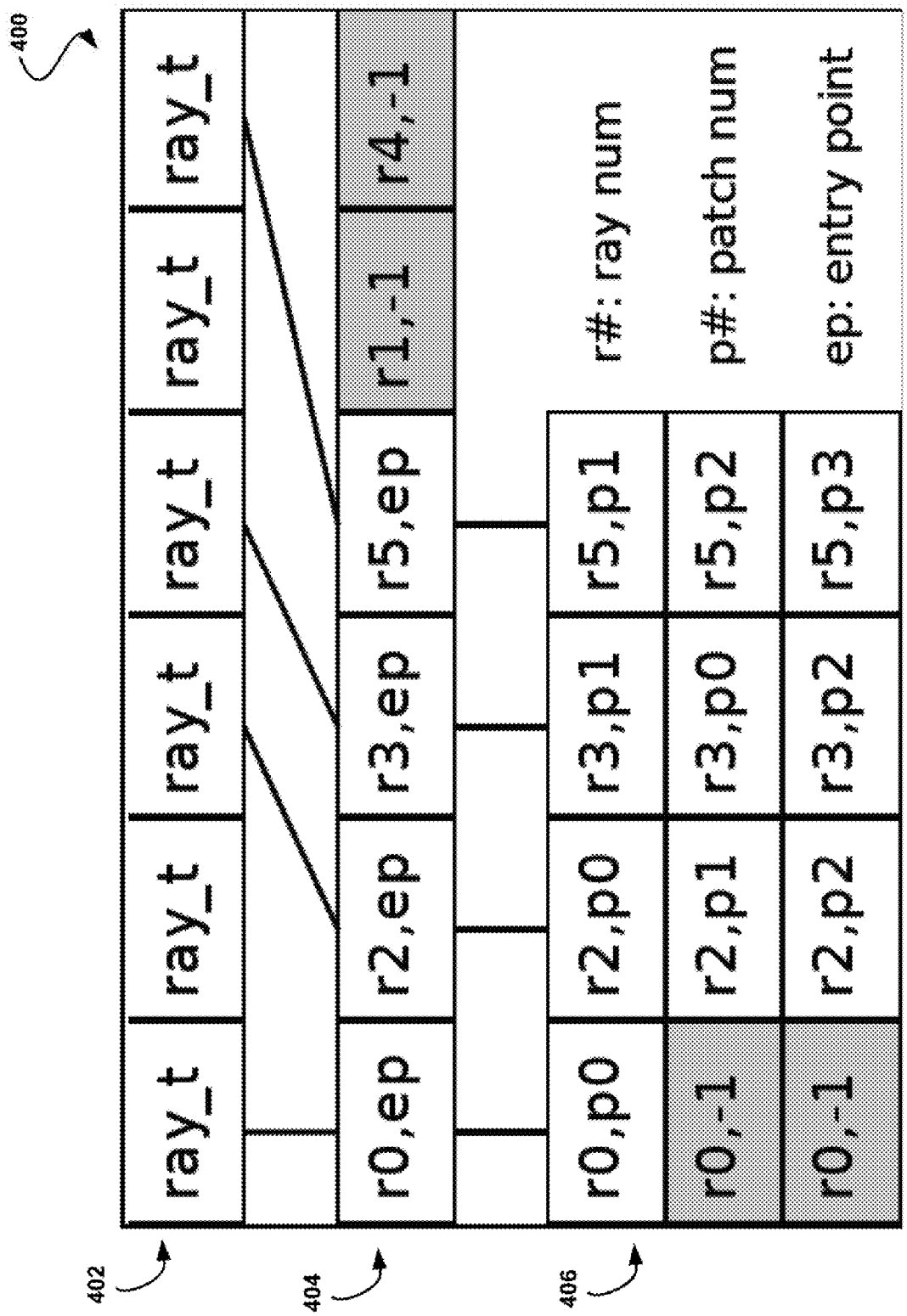
FIG. 4 shows data structures for efficiently ray tracing micropolygon or other highly complex geometry, in accordance with one embodiment.

FIG. 4 shows data structures 400 that may be used with one embodiment. Rays 402 that may be represented by a data type ray_t may be referenced by an array 404, which may store pairs of ray identification and hierarchy entry point, where a value of −1 may represent no reference. For each ray referenced in this array 404, N pairs of ray identification and object identification may be stored in another array 406 of size R times N. The latter array 406 of tuples may be sorted by object (or patch) identification later oil.

For someone skilled in the art, it is obvious how to implement the aforementioned techniques using spatial partitioning schemes instead of object list partitioning schemes. Such spatial partitioning schemes may include BSP trees, kd trees, and regular or hierarchical grids that may be stored explicitly or used implicitly. Variants of object list partitioning schemes that may be used include a bounding interval hierarchy and variants thereof. All of these techniques may be using memory that is bounded by a constant or linearly bounded in the number of objects. The object list partitioning schemes may include reference replication. Schemes featuring reference replication may only need to record tuples (rayid, leafid) that are different, however, the sorting of the tuples makes it easy to remove multiple entries. All data structures may be built on demand. Aside of axis-aligned bounding boxes, other bounding volumes like for example spheres may be applied. In case the objects do not fit into main memory, streaming the objects and bucket sorting may be applied to build a representation of objects that may be accessed with limited main memory. Such methods are known in the art.

Table 1 shows detailed timings (in seconds) for 1000 billion triangles in a forest image, in accordance with one embodiment. With high depth complexity and multiple cores, a single ray traversal may be beneficial. The number of tessellated patches is reduced due to sorted traversal and early out in the top level QBVH. In this case, timings were obtained on an eight core Xeon machine.

be split until the tessellation for each part fits into the buffer. In some situations, there may also be flexibility in increasing the buffer size. As an option, detecting a buffer overflow may be easily integrated with the computation of the conservative bounding boxes.

The number of $4^m = 2^m \times 2^m$ micropolygons and the topology (or connectivity) determined by the two-dimensional array of vertices may advert to using a complete quad-tree of axis-aligned bounding boxes as acceleration hierarchy for ray tracing the micropolygons. It should be noted that, although in some cases, complete trees for ray tracing may not be desired to be used, this concept may be very appropriate for tessellated surfaces patches.

The bottom-up construction of the complete quad-tree is linear in the number of nodes $$\sum_{i=0}^{m} 4^i \in O(4^m)$$

and thus linear in the number of micropolygons of one surface patch. For a total of n micropolygons this results in an $$O\left(n \log \frac{n}{4^m}\right)$$

construction time, given an $\mathcal{O}$ (n log n) procedure to set up the ray tracing acceleration data structure.

TABLE 1

| tessellate | | bottom-level [s] | top-level [s] | shade [s] | sort [s] | #tess. patches | total time [s] |
|---|---|---|---|---|---|---|---|
| Top-Level QBVH | 232.360001 | 339.585304 | 41.525017 | 120.095985 | 64.416071 | 4486828 | 319.380018 |
| Top-Level all-rays nm 1 | 267.062500 | 203.312500 | 1144.843750 | 123.574219 | 0.000000 | 5275258 | 1746.332031 |
| Top-Level all-rays nm 2 | 367.007812 | 343.136719 | 1651.222656 | 122.675781 | 0.000000 | 5489927 | 2491.605469 |

Tessellation and bottom-level timings for the QBVH variant are summed up over the number of cores. Thus, these figures do not add up to the total time. Top-level QBVH traversal is parallel as well. Thus, the algorithmic speedup factor is about five for just the top-level traversal. The high variance in the single visit traversal is due to the speculative sorting by one ray direction for the whole buffer, which may work well in some cases.

As can be seen in the comparison in Table 1, the QBVH top-level hierarchy outperforms the single visit variant in various ways. The chance of early termination and more sophisticated single ray traversal optimizations are very useful. Parallelization is another useful aspect, which may at least be tedious with the single visit traversal. In the case of repeated tessellation, single ray traversal tessellates less leaf nodes in the presence of highly occluded geometry.

In one embodiment, the micropolygonl buffer may represent $2^m \times 2^m$ micropolygons as a two-dimensional array of $(2^m+1) \times (2^m+1)$ vertices, where each four adjacent vertices define one micropolygon. The buffer may be filled by tessellating a surface patch of a leaf of the top-level hierarchy. Subsequently, the micropolygons may be intersected with all rays that intersect the axis-aligned bounding box of the top-level hierarchy leaf.

In the case that the tessellation of a surface patch is too large to fit into the micropolygon buffer, the tessellation may In many cases, motion approximated by linear splines is utilized in movie production. Given the instants $t_0 < t_1 < \ldots < t_n$ defining the time intervals $[t_i, t_{i+1})$, tracing a ray at time $t \in [t_i, t_{i+1})$ may be accomplished by instancing two micropolygon buffers, one at time $t_i$ and one at time $t_{i+1}$. The actual bounding boxes and micropolygons used during ray traversal then may be determined by linear interpolation.

If the rays are sorted by their time, each of the n time intervals needs to be touched at most once and allocating two micropolygon buffers may be sufficient. Concerning the top-level hierarchy, the same principles may be applied. However, depending on the cost to construct the hierarchy, it may be more efficient to use only one hierarchy based on bounding boxes conservatively covering the whole time interval $[t_0, t_n)$.

The specification of motion may be considered a temporal displacement, which may go beyond the classic concept of displacement. In fact, in some cases, motion curves (e.g. general splines, etc.) may be adaptively sampled depending on the required level of detail or the speed of motion, etc., which may be useful for fast motion. The set of time intervals may vary from patch to patch and may be chosen specific to the situation like for example specific to the times of the rays. If a convex hull property is available (e.g. for Bézier curves, NURBS, etc.), it may be possible to determine axis-aligned bounding boxes even for non-linear motion.

As an option, this ray tracing architecture may be designed to seamlessly fit into existing production pipelines with programmable shading. In one embodiment, SIMD instructions may be used for evaluating the surface area heuristic and axis-aligned bounding boxes may be in SSE layout. It should be noted that the class for surface patches should provide a technique to compute a bounding box and a technique to intersect a group of rays that may depend on a given time or time interval.

In most cases, surface patches that use a micropolygon buffer for ray tracing should implement a tessellation technique, that in its most classic variant computes the micropolygon vertices by either sampling or subdividing a surface patch, applies trimming and displacement, and stores interpolated (s, t) texture coordinates. Vertices may be displaced along sampled or interpolated per-vertex normals. Afterwards, a loop over all micro-polygons may evaluate whether or not the micro-polygon is clipped or trimmed.

Unless the micro-polygon is discarded, an associated bounding box, color from texture, and normal by vertex differences may be computed and stored. Such a tessellation technique should be aware of the resolution of the micropolygon buffer. In case of insufficient resolution, surface patches may be split.

In one embodiment, ray tracing the micropolygon buffer may begin by marking all axis-aligned bounding boxes of the hierarchy as empty before calling the tessellation technique. After the bounding boxes of the micropolygon have been determined, the bounding volumes of the inner nodes of the hierarchy are updated in a bottom-up manner, similar to MIP maps.

It should be noted that bounding boxes marked as empty may not need to update their parent boxes and may also be handled transparently during ray traversal. Since the memory for the micropolygon buffer data structure may be allocated once for the whole rendering process, optimizing for memory of the empty bounding boxes or omitted micropolygons may not be efficient.

The bounding volume hierarchy is a complete tree and therefore may be stored in pre-order as an array without pointers. Each 2×2 bounding box belonging to the same father may be stored in one structure, thus allowing for intersecting one ray with four bounding boxes using SIMD instructions for a current processor. In order to avoid address conversion during shading, MIP maps of colors and normals may be stored using the same memory layout as the bounding volume hierarchy.

For sufficiently fine tessellations (e.g. down to sub-pixel accuracy, etc.), the actual micropolygon intersection test may be replaced by using the intersection with the finest bounding box instead. Since the bottom-level bounding volume hierarchy is a complete tree, father and child indices may be computed from the node index.

Consequently, in one embodiment, the hierarchies may be interpreted and stored as a skip list, which may allow one to stream the tree through an array of rays using a SIMD or SIMT architecture (e.g. with a GPU). While this approach may be highly memory efficient, it may not benefit maximally from early termination, because this would require guaranteed ordered traversal. The efficiency of this approach may depend on memory latency.

In another embodiment, a technique for ray tracing freeform surface patches may be implemented. In this case, instead of storing vertices of micropolygons, a two-dimensional array of "micropatches" may be stored as well. The tessellation procedure then may correspond to subdividing and displacing the patch in order to fill the array.

In one embodiment, the bounding volume hierarchy may built in a standard fashion, however, instead of intersecting triangles of quadrilaterals, a high precision intersection may be used to directly intersect a ray with the micro-patches of the micro-patch grid.

For the case of Bézier surface patches, the micropatches may be the control polygons resulting from subdivision by the de Casteljau algorithm. This would include triangular patches as well, for example.

The principle of building a hierarchy implied by die connectivity of a subdivision process may also apply to different surfaces, such as multiresolution surfaces or trimmed NURBS. In these cases, such a hierarchy may be built in time linear in the number of elements resulting from the subdivision process.

Connectivity may also be specified by the data layout of an object. For example the triangles of a list of triangles may be enumerated in such a way, that a meaningful hierarchy of bounding volumes is found by just pairing each two adjacent triangles in the list and repeating the pairing process with the pairs until only one bounding volume is left.

Physically-based rendering generally requires a lot of rays to be traced. This number is typically too large to fit the required ray buffer into main memory. Also, at the beginning, all of the rays may not be known. Some effects (e.g. soft shadows, ambient occlusion, reflections, etc.) may require several passes to be rendered.

In various embodiments, there may be several choices, which may balance between depth complexity, re-tessellating, and memory requirements. For example, in one embodiment, rays may be re-injected as possible after an early termination event. As an option, this may be accomplished by replacing the terminated ray by a newly spawned ray, instead of removing it from the buffer. In most cases, this will utilize the ray buffer well and use the (rayid, leafid) buffer for new rays rather than to tackle depth complexity. This may be very beneficial in common algorithmic situations of scattering, computing ambient occlusion, testing shadow rays, etc.

In another embodiment, rays may be grouped by generation. In yet another embodiment, the screen may be tiled. In this way, some locality may be exploited for first generation lens connection rays. In general, it is most efficient to trace as many rays as possible (i.e. fit into main memory, etc.) at a time.

It should be noted that the use of an (rayid, leafid) array allows for computing the ray associated with a rayid from this number itself For common situations such as rays emerging from one point (e.g. a pinhole camera, point light shadows, ambient occlusion rays, etc.), this allows a user to completely omit the simultaneous storage of the rays. In other words, the rays may be computed on demand.

Although the ray tracing architecture may be designed to deliver precise visibility, approximate visibility may be implemented to increase performance. In one embodiment, this may be achieved by adaptively selecting the resolution parameter m of the micropolygon array. It should be noted that in another embodiment this technique may be applied to create adaptive voxelizations of the geometry.

In one embodiment, a level of detail (LOD) technique may be used. In some cases, when using LOD, if two adjacent patches are tessellated in a different LOD, there may be cracks along the boundary of the patches. Additionally, in some cases, a mechanism to identify the required LOD may be needed. As an option, this may be accomplished using ray differentials as a local approximation of the distance to the neighboring ray cast from the pixel raster. Further, in some cases, popping may occur, where objects suddenly appear in more detail, which results in distracting, quick changes in animations.

In the cases where cracking may potentially occur, cracking may be avoided by stitching the adjacent geometry together. However, because tessellation is sufficiently fine such that the smallest boxes of the BVH can directly be used as primitives, cracks do not appear, because by construction neighboring bounding boxes at least seamlessly touch each other. For example, if the adjacent box is larger, it will span at least the area of the two smaller boxes that may be included.

Ray differentials are an approximation of the distance to neighboring rays hitting the same surface. Using the techniques described above, all rays may be traced at once. Thus, there may not be a need for such an approximation, since the information about the other rays is available.

In some cases, however, it may be desirable to choose the LOD before tessellating a patch. That is, it may need to be decided for an LOD based on a patch bounding box and a group of rays intersecting this patch. As an option, this may be solved by assuming equal distribution of the ray directions and origins. Consequently, tessellation may be accomplished such that the number of resulting voxels is at least equal to the number of rays intersecting this patch.

With respect to popping, popping may benefit from the fact that LOD is chosen to be sub-pixel accurate for lens connection rays. In this way, no popping of directly visible geometry can take place. In some cases, however, for secondary effects as self-shadowing of a patch, popping may still become visible in form of a noticeable difference in shading. In one embodiment, this may be alleviated by adding a-priori knowledge of rays to be spawned at the surface to the LOD decision. Another way to create soft shadows is to complement the coarse levels with directional opacity information.

In order to ameliorate the self-intersection problem, the offset ε used to offset the ray origin of a ray leaving a surface should be selected according to the actual level of detail m. This may be achieved by choosing $$\varepsilon = \frac{d}{2^m},$$

where d is the length of the longest side of the axis-aligned bounding box of the tessellation in the micropolygon buffer. The offset ε such is not fixed per ray, but may depend on the currently processed object.

The micropolygon buffer object with its operations of tracing rays, building the implied bounding volume hierarchy, bounding box computation, and tessellation lends itself to hardware acceleration because memory requirements are constant and moderate, algorithms are sufficiently compact, and most parts can be executed in parallel.

In one embodiment, the implementation of the micropolygon buffer operations as an "FPGA personality" on the HC-1 series of supercomputers may be utilized as an efficient approach to hardware acceleration. Additionally, certain integer arithmetic ray tracing techniques may be especially suited for the micropolygon arrays. In this case, due to the spatial proximity of the micropolygons, their numeric range may be very limited. Consequently, reducing the precision to integers does not pose a problem. This, in connection with the memory capacities of modern FPGAs, allows a user to store the vertex array and bounding volume hierarchy of the micropolygon buffer on chip for interesting values of m.

If a coprocessor (e.g. an FPGA or GPU, etc.) cannot directly access main memory, data may be transferred asynchronously in order to hide latencies. The efficiency depends on the amount of data is being transferred. The minimum data set includes the rays and the micropolygon vertex array to be intersected and may assume that the implied bounding volume hierarchy is built on chip.

Alternatively, the tessellation may be performed on the co-processor also. This may require the surface patch data along with the displacement data to be transferred. Along these lines, all rays of a generation may be stored on the coprocessor, reducing the ray data to be transferred to a set of indices. In any case, ray distances need to be returned to the main processor. In one embodiment, the Cell and Larrabee processors may be utilized to implement the micropolygon buffer operations.

The image rendering architecture and techniques addressed above preserve the features of the Reyes architecture including the ability to separate sampling from shading. Since the algorithm is entirely based on ray tracing,.effects like such as reflections, shadows, or even global illumination may now be ray traced. This removes the need to find suitable approximations and simplifies workflow without restricting artistic freedom and expression.

Furthermore, the presented architecture may be viewed as a hybrid between rasterization and ray tracing. In one embodiment, the reordering of the computations may be implemented in the context of a rasterizer and may work the same way for a rasterizer. In this case, the leaves may be tested for visibility via occlusion queries, the geometry may then be instanced and rasterized.

Figure 5:
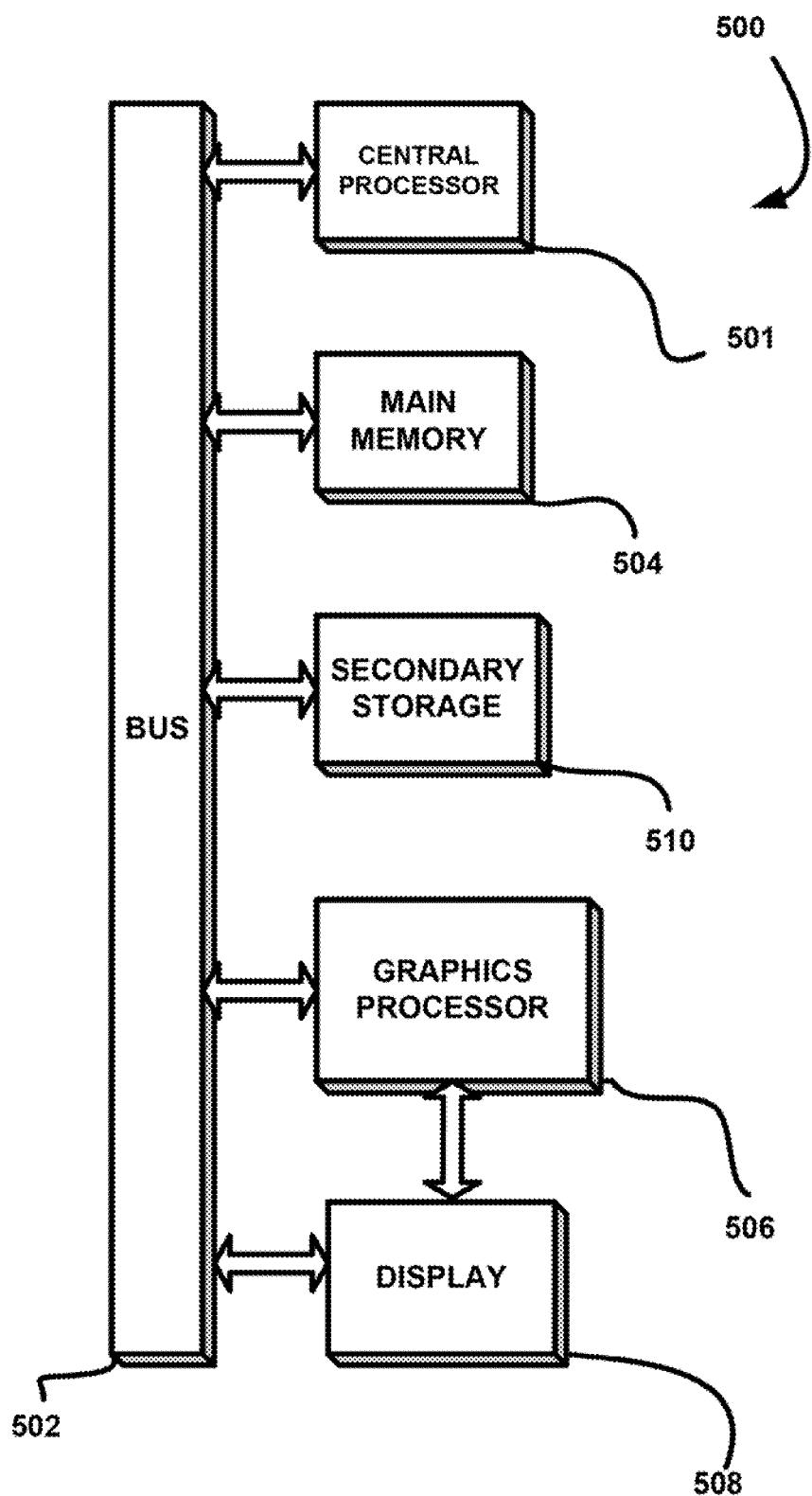
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU). Similarly, in one embodiment, the foregoing modules may be situated on a semiconductor platform like an FPGA and/or other reconfigurable device. As an option, these devices may be in-socket devices.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to, a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying a plurality of surface patches;
    establishing a first hierarchy by organizing the surface patches into an acceleration structure, such that each leaf node of the first hierarchy references a bounding box of a different one of the surface patches;
    tracing rays using the first hierarchy to identify that at least one of the bounding boxes of one of the surface patches is potentially intersected by at least one of the rays;
    for a predetermined number of the potential intersections between one of the rays and one of the bounding boxes of one of the surface patches, storing in a single array a tuple including a ray identifier of the one of the rays and a leaf identifier associated with the one of the surface patches in the one of the bounding boxes that are potentially intersected;
    for each of the leaf identifiers stored in the array:
        determining a level of detail of a two-dimensional array of vertices and micropolygons based on the bounding box of the surface patch that is referenced by the leaf identifier and the rays identified to potentially intersect the surface patch, such that a number of the micropolygons is at least equal to a number of the rays identified to potentially intersect the surface patch referenced by the leaf identifier;
        decomposing, on-demand, the surface patch referenced by the leaf identifier into the two-dimensional array of vertices and micropolygons;
        establishing a second hierarchy for the two-dimensional array of vertices and micropolygons of the surface patch referenced by the leaf identifier, the second hierarchy being determined by a connectivity of the micropolygons in the two-dimensional array of vertices and micropolygons, in order to accelerate ray tracing; and
        intersecting, utilizing the second hierarchy, the micropolygons of the two dimensional array of vertices and micropolygons of the surface patch referenced by the leaf identifier with all rays in the array that are stored in one of the tuples of the array including the leaf identifier.

2. The method of claim 1, wherein self intersection is ameliorated by offsetting rays depending on at least one of: at least one of the potentially intersected surface patches; at least one of the two-dimensional arrays of vertices and micropolygons; and at least one of the bounding boxes of one or more of the two-dimensional arrays of vertices and micropolygons.

3. The method of claim 1, wherein self intersection is ameliorated by offsetting rays proportional to a longest side of at least one of the surface patch bounding boxes divided by 2 to the power of the level of detail, where zero corresponds to a coarsest level of detail.

4. The method of claim 1, wherein an intersection of a ray and one of the surface patch bounding boxes associated with the two-dimensional array of vertices and micropolygons is utilized as an approximate intersection of the ray and the two-dimensional array of vertices and micropolygons decomposed from the one of the surface patches.

5. The method of claim 1, wherein each of the potentially intersected surface patches is tessellated into one of the two-dimensional arrays of vertices and micropolygons from which the second hierarchy is capable of being built in time linear in a number of micropolygons.

6. The method of claim 5, wherein the tessellation yields one of a triangular or quadrilateral mesh.

7. The method of claim 5, wherein each of the potentially intersected surface patches include one of a multiresolution surface, a subdivision surface, or a parametric surface, which is capable of being trimmed and displaced.

8. The method of claim 7, wherein motion is considered as a temporal displacement.

9. The method of claim 5, wherein, for each of the leaf identifiers stored in the array, a buffer is filled by tessellating the surface patch referenced by the leaf identifier into the two-dimensional array of vertices and micropolygons.

10. The method of claim 9, wherein the buffer filled by tessellating the surface patch referenced by the leaf identifier represents $2^m \times 2^m$ of the micropolygons as the two-dimensional array of $(2^m+1) \times (2^m+1)$ of the vertices, where m is a resolution parameter of the two dimensional array.

11. The method of claim 1, wherein objects are specified with motion over time.

12. The method of claim 11, wherein the first hierarchy and each of the two-dimensional arrays of vertices and micropolygons are generated adaptively with respect to their motion and potentially for a given time.

13. The method of claim 11, further comprising simulating motion blur.

14. The method of claim 13, wherein interpolation is used to compute all data at the given time to perform the ray intersections.

15. The method of claim 13, wherein segments of motion are capable of being bounded by bounding volumes.

16. The method of claim 1, wherein ray data is computed from a ray identification number.

17. The method of claim 1, wherein a traversal of the first hierarchy includes considering multiple rays simultaneously such that each of the surface patches is considered at most once during the ray tracing.

18. The method of claim 1, further comprising, for each of a plurality of rays:
recording a predefined number of closest ones of the surface patches that are potentially intersected; and
sorting records of pairs of ray and surface patch identification resulting from the recording by surface patch identification.

19. The method of claim 18, wherein at least one of a predefined number of recorded pairs is increased when rays are terminated or terminated rays are directly replaced by new rays.

20. The method of claim 19, wherein a high precision intersection is used to directly intersect a ray with micropatches of a micro-patch grid.

21. The method of claim 19, wherein the new rays are computed in dependence of the terminated rays and directly are intersected with a currently decomposed two-dimensional array of vertices and micropolygons.

22. The method of claim 1, wherein the ray tracing is performed in parallel.

23. The method of claim 1, wherein, for each of the leaf identifiers stored in the array, decomposing the surface patch referenced by the leaf identifier into the two-dimensional array of vertices and micropolygons includes generating the two-dimensional array of vertices and micropolygons.

24. The method of claim 1, wherein the connectivity of the micropolygons is specified by a data layout of the surface patch referenced by the leaf identifier, such that triangles of a list of triangles are enumerated, and a hierarchy of bounding volumes is determined by pairing each two adjacent triangles of the list of triangles and repeating the pairing until only one bounding volume remains.

25. The method of claim 1, further including sorting the array based on the leaf identifiers such that all rays that potentially intersect a particular bounding box of a particular one of the surface patches are located in one block at a beginning of a buffer.

26. The method of claim 25, wherein the ray identifiers of the sorted array are maintained in an original order for associating pixel positions and the rays.

27. The method of claim 1, wherein the decomposing and the intersection of at least two of the surface patches identified by at least two of the leaf identifiers in the array are performed in parallel by at least two threads.

28. The method of claim 27, wherein each thread of the parallel processing selects from the array a next leaf identifier as a task.

29. The method of claim 27, wherein intersection results of the at least two of the surface patches identified by the at least two of the leaf identifiers in the array are synchronized by writing ray intersections to buffers for each thread, and subsequently synchronizing the intersection results.

30. A computer program product embodied on a non-transitory computer readable medium, comprising:
computer code for identifying a plurality of surface patches;
computer code for establishing a first hierarchy by organizing the surface patches into an acceleration structure, such that each leaf node of the first hierarchy references a bounding box of a different one of the surface patches;
computer code for tracing rays using the first hierarchy to identify that at least one of the bounding boxes of one of the surface patches is potentially intersected by at least one of the rays;
computer code for, for a predetermined number of the potential intersections between one of the rays and one of the bounding boxes of one of the surface patches, storing in a single array a tuple including a ray identifier of the one of the rays and a leaf identifier associated with the one of the surface patches in the one of the bounding boxes that are potentially intersected;
computer code for, for each of the leaf identifiers stored in the array:
determining a level of detail of a two-dimensional array of vertices and micropolygons based on the bounding box of the surface patch that is referenced by the leaf identifier and the rays identified to potentially intersect the surface patch, such that a number of the micropolygons is at least equal to a number of the rays identified to potentially intersect the surface patch referenced by the leaf identifier;
decomposing, on-demand, the surface patch referenced by the leaf identifier into the two-dimensional array of vertices and micropolygons;
establishing a second hierarchy for the two-dimensional array of vertices and micropolygons of the surface patch referenced by the leaf identifier, the second hierarchy being determined by a connectivity of the micropolygons in the two-dimensional array of vertices and micropolygons, in order to accelerate ray tracing; and
intersecting, utilizing the second hierarchy, the micropolygons of the two dimensional array of vertices and micropolygons of the surface patch referenced by the leaf identifier with all rays in the array that are stored in one of the tuples of the array including the leaf identifier.

31. An apparatus, comprising:
one or more processors capable of:
identifying a plurality of surface patches;
establishing a first hierarchy by organizing the surface patches into an acceleration structure, such that each leaf node of the first hierarchy references a bounding box of a different one of the surface patches;
tracing rays using the first hierarchy to identify that at least one of the bounding boxes of one of the surface patches is potentially intersected by at least one of the rays;
for a predetermined number of the potential intersections between one of the rays and one of the bounding boxes of one of the surface patches, storing in a single array a tuple including a ray identifier of the one of the rays and a leaf identifier associated with the one of the surface patches in the one of the bounding boxes that are potentially intersected;
for each of the leaf identifiers stored in the array:
determining a level of detail of a two-dimensional array of vertices and micropolygons based on the bounding box of the surface patch that is referenced by the leaf identifier and the rays identified to potentially intersect the surface patch, such that a number of the micropolygons is at least equal to a number of the rays identified to potentially intersect the surface patch referenced by the leaf identifier;
decomposing, on-demand, the surface patch referenced by the leaf identifier into the two-dimensional array of vertices and micropolygons;
establishing a second hierarchy for the two-dimensional array of vertices and micropolygons of the surface patch referenced by the leaf identifier, the second hierarchy being determined by a connectivity of the micropolygons in the two-dimensional array of vertices and micropolygons, in order to accelerate ray tracing; and intersecting, utilizing the second hierarchy, the micropolygons of the two dimensional array of vertices and micropolygons of the surface patch referenced by the leaf identifier with all rays in the array that are stored in one of the tuples of the array including the leaf identifier.

* * * * *